Patented Mar. 31, 1953

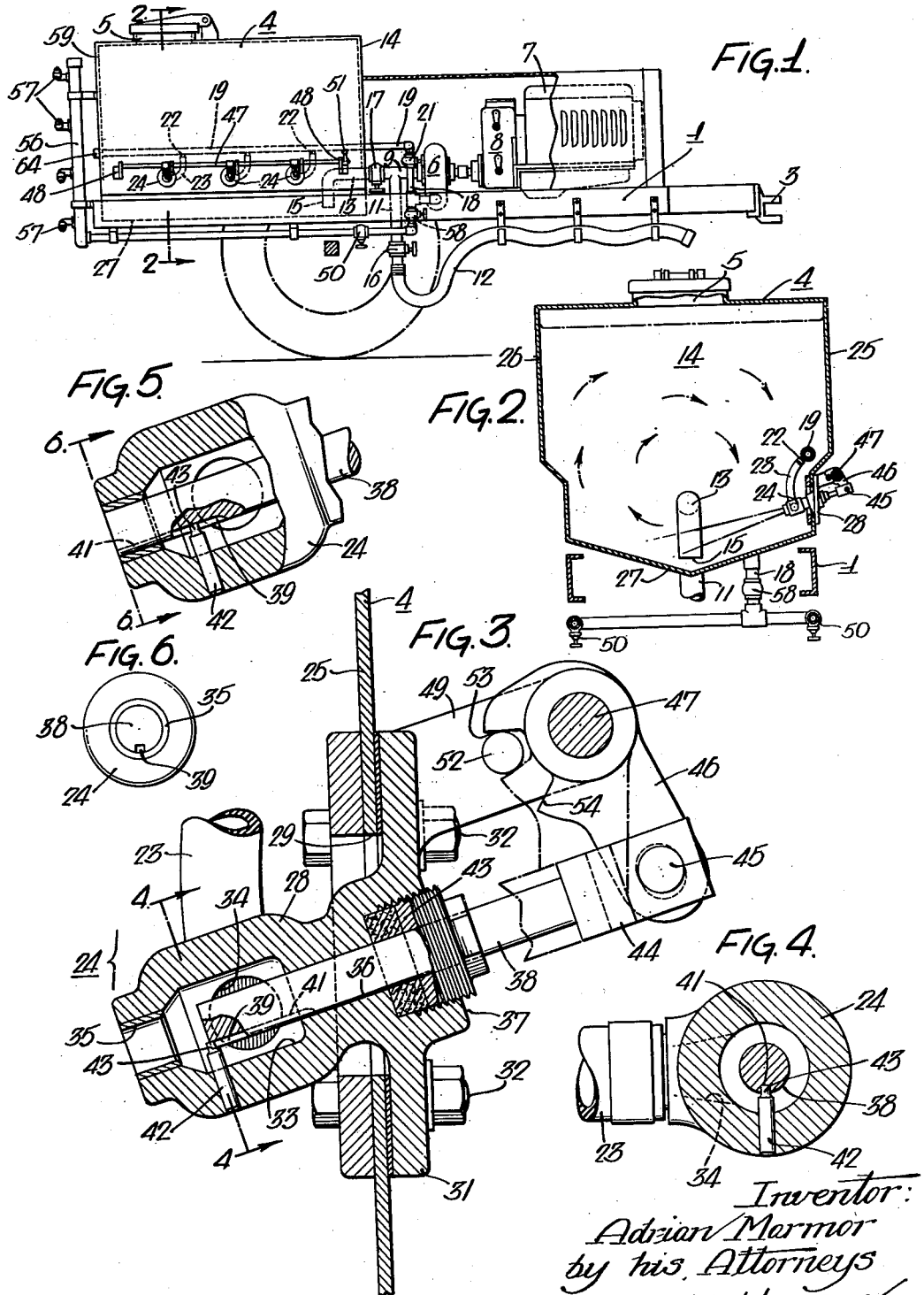

2,633,383

UNITED STATES PATENT OFFICE 2,633,383

SPRAYING APPARATUS

Adrian Marmor, Philadelphia, Pa., assignor to Hale Fire Pump Co., Conshohocken, Pa., a corporation of Pennsylvania Application February 7, 1950, Serial No. 142,898

3 Claims. (Cl. 299—59)

This invention relates to an improvement in orchard spraying and like apparatus and a principal object of the invention is to provide an improved pre-mixing and agitating means for apparatus of this type.

Another object of the invention is to provide an improved pre-mixing and agitating device for sprayers in the form of an attachment of relatively simple structural and mechanical form which may be readily applied to existing sprayer apparatus.

Still another object of the invention is to provide a unitary device that, by simple adjustment of a single moving part, may perform the dual functions of pre-mixing and agitating.

A further object of the invention is to provide a device of the stated character having self-cleaning characteristics.

The invention resides also in certain novel structural and mechanical details hereinafter described and illustrated in the attached drawings wherein:

Fig. 1 is a side elevational view of a sprayer unit equipped with pre-mixing and agitating devices in accordance with my invention;

Fig. 2 is a sectional view on the line 2—2, Fig. 1;

Fig. 3 is a vertical sectional view through one of the pre-mixing and agitating nozzles;

Fig. 4 is a section on the line 4—4, Fig. 3;

Fig. 5 is a fragmentary sectional view of the discharge end of one of the pre-mixing and agitating nozzles showing the control element in a different position of adjustment from that illustrated in Fig. 3; and Fig. 6 is an end elevation of the element shown in Fig. 5 as viewed from the line 6—6 of the latter figure.

With reference to the drawings, the sprayer unit shown in Fig. 1 is of the trailer type including a frame or chassis 1 and supporting wheels 2. At the front of the frame 1 is a hitch 3 by means of which the unit may be attached to a tractor or other suitable automotive means.

Supported on the frame 1 is a tank 4 which is adapted to contain the liquid spray medium, this tank having at the top a normally closed port 5 for introduction of the solid components of the said medium. Water is introduced into the tank 4 by means of a pump 6 which is mounted in the frame and which is actuated by a similarly mounted gasoline engine 7. The engine is connected to the pump through a suitable speed change unit 8. The pump 6 is of centrifugal type in the present instance and has connected to the suction side thereof a pipe 9. This pipe has a branch 11 which is connected at its outer end to a length of flexible hose 12; and a second branch 13 extends through the front wall 14 of the tank 4 into the interior and to a point 15 near the bottom of the latter. Valves 16 and 17 control the branches 11 and 13 respectively.

The discharge of the pump 6 is connected through a pipe 18 with pipe 19 which extends horizontally through the front wall 14 into the interior of the tank at one side of the latter. The operative connection of this pipe with the pump may be controlled by a valve 21. The pipe 19 has a longitudinally arranged series of discharge nipples 22, each of which is connected through a flexible duct 23 with a nozzle element 24, these elements being mounted in the proximate side wall 25 of the tank, as best illustrated in Fig. 3. The nozzle elements extend in horizontal series adjoining the bottom wall 27 of the tank.

As shown in Fig. 3, each of the elements 24 comprises a body member 28 which projects through an opening 29 in the wall of the tank and which has a circular flange 31 which is secured by bolts 32 against the outer face of the wall, said flange in effect closing the said opening 29 around the body member 28. The inner end of the body member 28 contains a chamber 33, and the flexible duct 23 associated with this particular nozzle element is connected to the chamber 33 by way of a port 34 in the wall of the latter. A port 35 is also provided in the inner end of the body member 28 which opens directly into the chamber 33.

The body member 28 also comprises a cylindrical bore 36 which extends in alignment with the port 35 from the inner end of the chamber 33 to the outer surface 37 of the body member, and this bore contains a neatly fitted plunger 38. The inner end of the plunger projects into the chamber 33, and when the plunger is in a retracted position as shown in Fig. 3, the discharge port 35 is left entirely unobstructed and in direct communication through the chamber with the port 34. When the plunger 38 is advanced, however, as shown in Fig. 5, the inner end thereof will neatly fit within and will effectively close the port 35 except for a small channel 39 formed by a longitudinal groove 41 in the underside of the plunger. The groove 41 terminates in the outer end surface of the plunger and is of greater length than the axial dimension of the port 35, as best shown in Fig. 5, so that liquid may pass from the chamber 33 through the channel 39 even though the port 35 is otherwise closed by the plunger. It will be noted that a pin 42 is mounted in the wall of the chamber 33 and projects into the latter, said pin having a reduced tip 43 which fits neatly into the groove 41. The function of this pin will be hereinafter described.

A suitable stuffing box 43 seals the joint where the plunger 38 passes through the wall of the body member. The outer end of the plunger carries a clevis 44 in which is secured, by means of a pin 45, to the outer end of an arm 46, this arm being attached to a shaft 47 journalled in brackets 48, 48 secured to the tank wall. The shaft 47 finds support also in bracket arms 49 projecting from the flanges 31 of the nozzle fittings 24. The forward end of the shaft 47 carries a handle 51 by means of which the shaft may be rocked in its journal. Each of the bracket arms 49 carries a laterally projected stop pin 52 which, by engagement with shoulders 53 and 54 on the hub portion of the proximate arm 46, limits the extent of the rocking movement of the shaft 47 and thereby also limits the resulting longitudinal movement of the plungers 38.

It will be understood that similar nozzle elements and nozzle adjusting means may, if desired, be provided on the wall 26, for connection with discharge of the pump, but it is desirable for functional reasons, as hereinafter set forth, to confine operation at any given time to the nozzles on one side only of the tank.

It will be noted by reference to Fig. 2 that the bottom wall 27 of the tank slopes downwardly toward the center from each of the side walls 25 and 26, and that the inner ends of the nozzle elements 24 are directed diagonally downward toward the central low portion of the tank bottom. It will be noted also by reference to this same figure that the lower portion of the side wall 25 in which the elements 24 are mounted, and similarly the wall 26, is inset from the plane of the upper portion of the side wall so as to form a recess within which the fittings 24 and the shafts 47 are housed.

The pipe 18 of the pump discharge is connected to a pair of pipes 55, 55 which extend rearwardly under the respective opposite sides of the frame 1, and are connected with a pair of upright headers 56 at the rear end of the tank. Each of the headers 56 has a longitudinal series of discharge nozzles 57 which may be directed to the opposite sides of the sprayer unit. The connection between both of the pipes 55 and the pump discharge is controllable by a valve 58, and preferably a valve 59 is provided in each of the pipes for individual control.

In operation, the normal initial step is that of mixing the spray ingredients in the tank 4. The solids component, as previously set forth, are introduced through the port 5 in the top of the tank. Thereafter, with the valves 17 and 58 closed, and with the valves 16 and 21 open, the pump 6 may be operated to draw water from a suitable source with which the hose 12 has been connected and to introduce this water into the tank 4 through the pipes 19 for mixture with the aforesaid solids. During this mixing operation, the plungers 38 of the nozzle elements 24 are retracted, as shown in Fig. 3, so that water may pass freely and in maximum volume to the tank. The streams of water thus projected toward the central low portion of the tank bottom through the nozzle ports 35, effects a thorough and rapid mixing of the ingredients of the spray medium.

Following introduction of the required quantity of water in this manner, the hose 12 is disconnected from the water source and the valve 16 is closed. By then opening the valve 17, the liquid spray mixture may be circulated through the pump which withdraws the mixture from the tank through the pipe 13 and returns it to the tank by way of the pipes 19 and nozzle fittings 24. Additional mixing of the components of the spray may be obtained in this manner if necessary.

For the spraying operation the valve 58 will be opened together with the valves 17 and 21, and the plungers 38 of the units 24 will be adjusted to the position shown in Fig. 5. Under these circumstances, as previously described, the discharge from the nozzle units will take the form of high velocity jets projected through the channels 39, these jets being directed downwardly and laterally into the lower part of the tank and toward the low central portion thereof in which any solids separating from the spray mixture will tend to collect. The high velocity jets will thus function to maintain in suspension the solids thus tending to separate by gravity and will continuously agitate the liquid contents of the tank and will thus insure a proper homogeneous distribution of the solids of the spray mixture in the water vehicle. Since the liquid thus discharged through the jet ports 39 is only a small part of the total volume discharged by the pump, the agitating means has no material effect upon the effective pressure within the headers 56.

The arrangement of the nozzles has a material effect upon the character and effectiveness of the agitation both in the pre-mixing and spraying operations. By using a single set of nozzles at one side of the tank directed laterally at the bottom of the latter, the nozzle discharge has the effect of setting up a turbulent rotary circulation of the contents of the tank which is highly effective for the intended purposes. Simultaneous use of two sets of nozzles at the opposite sides respectively of the tank, while creating a desirable turbulence, would tend to minimize circulation of the body of liquid as a whole and would therefore be relatively ineffective to the primary end of homogeneity in the discharged spray.

It will be noted that the pin 42, which by reason of the tip 43 which closely fits the groove 41 of the plunger, as described, will function to maintain this groove free from the sediment that otherwise might clog the jet channel 39. Each longitudinal movement of the plunger 38 will effect a complete scouring and cleaning of the groove 41, it being noted that in the fully retracted position of the plunger 38 the pin will occupy a position in the extreme outer end of the groove so that any subsequent advance movement of the plunger will effect a complete cleaning of the operative length of the groove. It will be noted also, by reference to Fig. 1, that the pipe 19 extends through the rear wall 59 of the tank 4, the projecting end being provided with a removable cap 64 whereby access may be had to the interior of the pipe from the outside of the tank for cleaning purposes.

I claim:

1. A nozzle element comprising a body member containing a chamber and a discharge port in the wall of said chamber, a supply port communicating with said chamber, a plunger adjustable in said body between advanced and retracted positions, said plunger when advanced entering the discharge port and when retracted leaving the port unobstructed, said plunger neatly fitting said discharge port and having in the exterior surface thereof a longitudinal groove forming a restricted channel from the said chamber to the exterior of the body when the plunger is in the advanced position, and a fixed pin projecting into the chamber and having its inner extremity fitted to said groove.

2. A nozzle comprising a hollow body having an inlet and discharge port, a member fitted to the discharge port and having a groove in the outer face thereof affording passage of fluid through the port, said groove intersecting the outer end surface of the member and said member being movably mounted in the body and being retractable from the port, a pin in said body projecting into the groove at a point inwardly of the port and relatively fixed with respect to said member so as to traverse the channel when the member is retracted to clear the channel of accumulated solids, and means for limiting the retractive movement of the member to a point where the pin occupies a position in the extreme outer end of the groove.

3. A nozzle comprising a hollow body having an inlet and discharge port, means for clearing the discharge port of accumulated solids, said means including a plunger slidably mounted in the body and projecting through the wall of the latter, and means for mounting the nozzle in the wall of a tank, said mounting means including a flange arranged for attachment to the said wall over an opening in the latter so as to seal the opening and to support the said nozzle body with the discharge port thereof in the interior of the tank and the outer projecting end of the plunger on the outside of the tank, actuating means for the plunger, and means on the nozzle body for supporting said actuating means in position for attachment to the outer projecting end of the plunger.

ADRIAN MARMOR.

REFERENCES CITED

The following references are of record in the file of this patent:

UNITED STATES PATENTS

| Number | Name | Date |
|---|---|---|
| 470,583 | Mestern | Mar. 8, 1892 |
| 515,491 | Hanford | Feb. 27, 1894 |
| 1,513,975 | Eichelberger | Nov. 4, 1924 |
| 1,561,809 | Valerius | Nov. 17, 1925 |
| 1,839,188 | Wenderhold | Dec. 29, 1931 |
| 1,840,863 | Wenderhold | Jan. 12, 1932 |
| 2,013,370 | Tygart | Sept. 3, 1935 |
| 2,260,301 | Cushman | Oct. 28, 1941 |
| 2,381,649 | Dalton | Aug. 7, 1945 |
| 2,462,034 | Zeck | Feb. 15, 1949 |
| 2,504,009 | De Phillips et al. | Apr. 11, 1950 |